US005223858A

United States Patent [19]

Yokoi et al.

[11] Patent Number: 5,223,858

[45] Date of Patent: Jun. 29, 1993

[54] RECORDING APPARATUS

[75] Inventors: Katsuyuki Yokoi; Mikio Shiga, both of Yokohama, Japan

[73] Assignee: Canon Kabushiki Kaisha, Tokyo, Japan

[21] Appl. No.: 684,233

[22] Filed: Apr. 12, 1991

[30] Foreign Application Priority Data

Apr. 20, 1990 [JP] Japan .................................. 2-105621
Apr. 24, 1990 [JP] Japan .................................. 2-106585

[51] Int. Cl.[5] ...................... G01D 15/24; G03G 21/00; B41J 13/10

[52] U.S. Cl. .................................... 346/134; 346/136; 346/140 R; 355/308; 355/321; 400/596

[58] Field of Search .................... 346/134, 136, 140 R; 355/308, 321; 400/596

[56] References Cited

U.S. PATENT DOCUMENTS 4,463,359 7/1984 Ayata et al. ......................... 346/1.1
4,834,568 5/1989 Kagami et al. ................... 400/707.1
5,017,945 5/1991 Sasai et al. .......................... 346/136

FOREIGN PATENT DOCUMENTS 0263319 4/1988 European Pat. Off. .
57-146267 9/1982 Japan .
60-227568 11/1985 Japan .
61-013366 1/1986 Japan .

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A recording apparatus using a recording head driven in accordance with print information includes a feeder for feeding a recording material; a discriminator for discriminating presence or absence of next printing information before completion of discharging of a current printed recording material; and a controller for controlling the feeder to start feeding of the next recording material prior to completion of the discharging of the current recording material, when the discriminator discriminates the presence of the next printing information.

15 Claims, 13 Drawing Sheets

RECORDING APPARATUS

FIELD OF THE INVENTION AND RELATED ART

The present invention relates to a recording apparatus for recording images or the like on a recording material in accordance with data supplied from a host apparatus.

A serial type recording apparatus is known wherein an ink jet type recording head and the recording material are moved in a main scan direction and a sub-scan direction, respectively.

In the conventional serial type recording apparatus, a sheet feeding operation, a recording operation and a sheet discharging operation are effected as a unit in a series.

Referring first to FIG. 13, there is shown a flow chart which is an example of the recording material feeding control steps. At step S301, the sheet feeding motor is driven to rotate the sheet feeding roller so that the recording material is supplied from a sheet feeding stacker to a conveying roller. Then, the conveying roller is driven by a line feed motor to feed the recording material to the recording position. At step S302, the printing is effected on the recording material. When one printing operation is completed, the discrimination is made at step S303 as to whether or not the trailing edge of the recording material reaches a trailing edge sensor disposed upstream of the recording position with respect to the movement direction of the recording material. If the result of the discrimination is negative, the operation returns to the step S302 to effect the printing operation. Thereafter, steps S302 and S303 are repeated. When the trailing edge is detected by a trailing edge sensor, that is, when the trailing edge of the recording material passes by the trailing edge sensor, the operation proceeds to step S304.

At step S304, "0" is set in an integration L of the recording material feed Ln corresponding to a recording width of one scan. At steps S305 and S307, the printing operation is repeated until the integration L exceeds a printable distance L2.

If the integration L exceeds the distance L2 as a result of the discrimination at step S305, the operation proceeds to step S308 where the recording material is discharged from the printing position. At step S309, the discrimination is made as to whether or not the printing data from the host apparatus remains in the buffer memory. If so, the operation returns to the step S301.

Since, however, in the conventional example, the sheet feeding, recording and sheet discharging operations are carried out as an unseparable unit in series, the following problem arises. When the printing operation is effected on a plurality of recording materials, the time required from the end of the recording operation on the current recording material to the starting of the recording operation on the next recording material is long, because the next recording material is not supplied until the current recording material is discharged from the printing position. This is more so, where the distance from the sheet feeding stacker to the printing position is long and/or when the number of recording materials to be printed is large. This decreases the throughput of the recording apparatus.

As to a recording apparatus having an automatic sheet feeding apparatus, it will be considered that the next recording material is supplied unconditionally during the discharging operation of the current recording material.

However, if this is done, the recording material is present in the recording apparatus even after completion of the recording material, so that a problem of the curling arises.

SUMMARY OF THE INVENTION

Accordingly, it is a principal object of the present invention to provide a recording apparatus having an improved throughput.

It is another object of the present invention to provide a recording apparatus wherein the next recording material feeding operation is started before the completion of the discharging of the current recording material.

It is a further object of the present invention to provide a recording apparatus wherein at the point of time when the recording material is fed through a distance corresponding to a recordable width after detection of the trailing edge of the recording material by a sensor provided upstream of the recording material, the discrimination is made as to the presence or absence of the recording data for the next page in the buffer memory; and if the data is present, the next recording material is fed before completion of the discharging of the current recording material.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring to the accompanying drawings, the preferred embodiments of the present invention will be described in detail.

Figure 1:
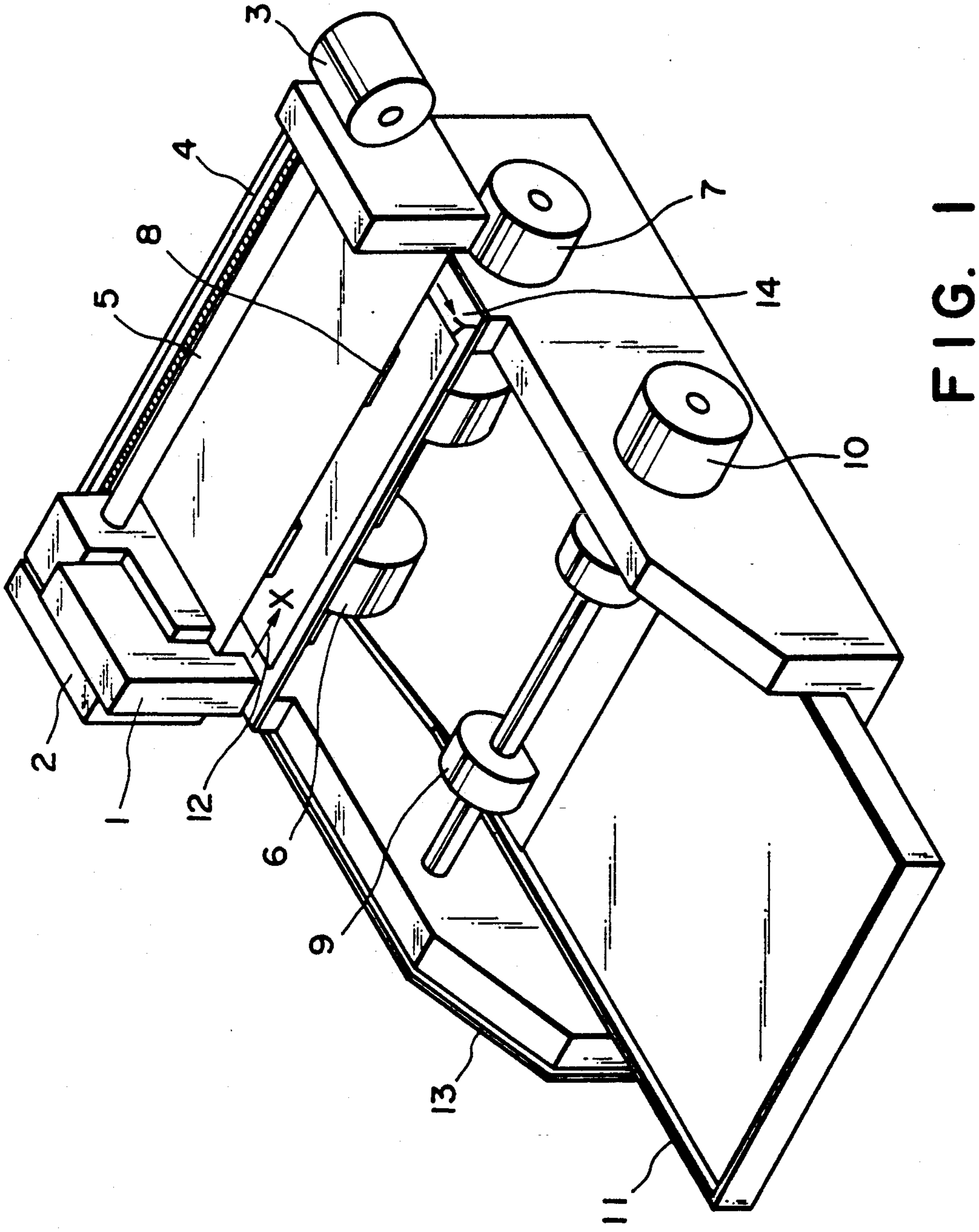
FIG. 1 is a perspective view of a recording apparatus according to an embodiment of the present invention.
Figure 2:
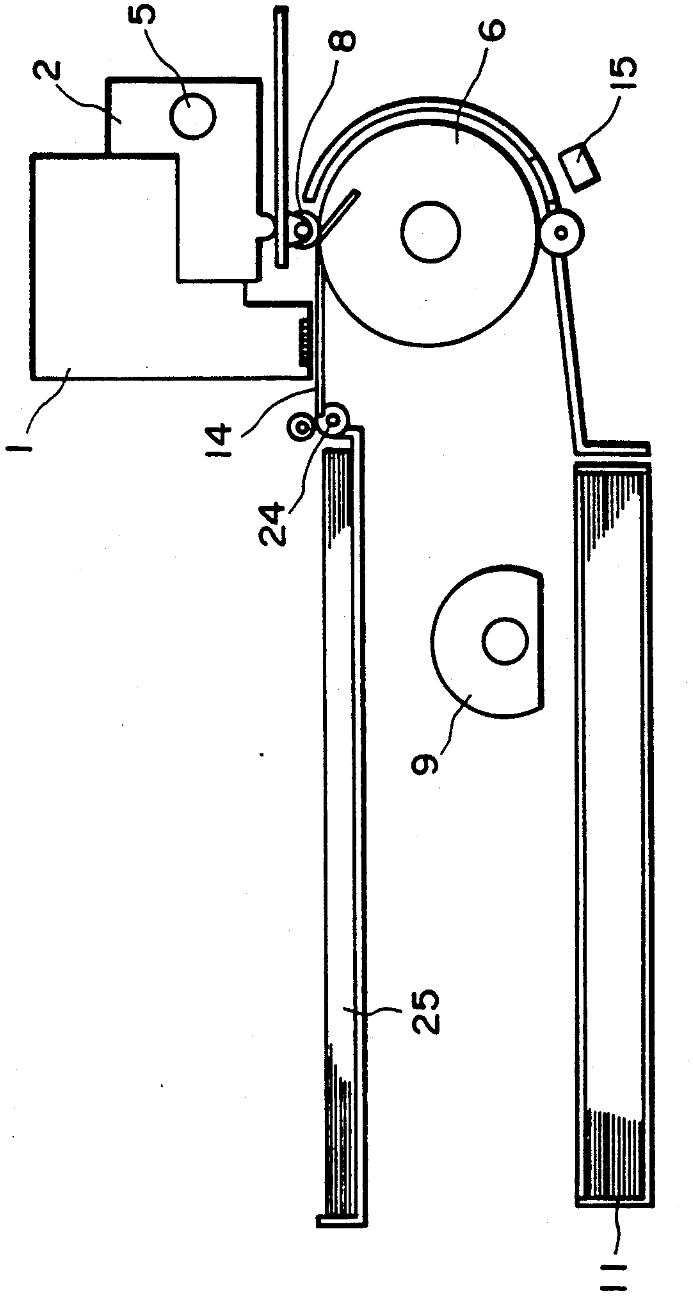
FIG. 2 is a sectional view of the recording apparatus of FIG. 1.
Figure 3:
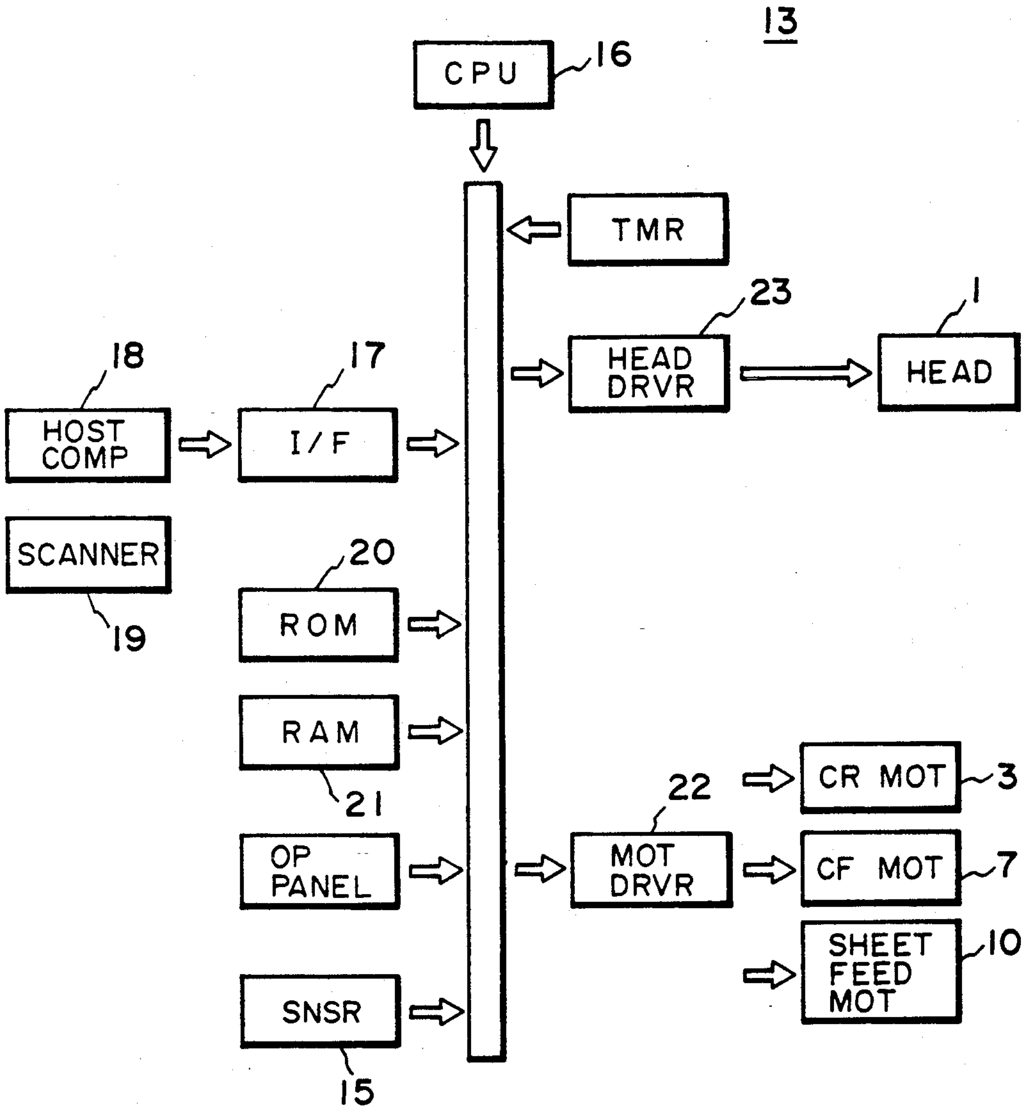
FIG. 3 is a block diagram of a control system of the recording apparatus shown in FIGS. 1 and 2.

FIGS. 1, 2 and 3 show a serial type recording apparatus according to an embodiment of the present invention.

As shown in FIGS. 1 and 2, the recording apparatus comprises a recording head (recording means) 1, a carriage 2 for carrying the recording head 1 and for moving it in a main-scan direction (X direction), a CR (carriage) motor for driving the carriage 2, a driving belt 4 for transmitting the driving force from the CR motor 3 to the carriage 2, a carriage shaft 5 for guiding the carriage 2 for the scanning operation, a feeding roller 6 for feeding the recording material in the sub-scan direction (Y direction), an LF (line feed) motor 7 for driving the feeding roller 6, a pinch roller 8 for urging the recording material onto the feeding roller 6, a recording material supplying roller for feeding the recording material from a sheet supply stacker to the feeding roller 6, a sheet feeding roller 10 for driving the supplying roller 9, a sheet supplying stacker for stacking the printed recording materials, a control circuit 13 for controlling the operation of the recording apparatus, a recording position 14 for effecting recording on a recording material 12 by the recording head 1, a sensor 15 for checking whether the recording material is present between the supply stacker 11 and the recording position 14, a recording material discharging roller 24 driven in association with the feeding roller by the LF motor 7, and a stacker 25 for stacking the printed recording materials.

In this embodiment, the recording head 1 is of a type wherein thermal energy is used to produce a change of state of the ink, by which a droplet of the ink is ejected or discharged from an ejection outlet. The recording head 1 has an array of ejection outlets (64 ejection outlets) arranged in Y direction. The respective ejection outlets communicate with ink passages, which are connected with a common ink chamber. Each of the ink passages has an ink ejecting heater adjacent the ejection outlet. In accordance with the recording data, the ejection heater is driven to generate heat, upon which a bubble is formed. The production of the bubble ejects the droplet of the ink.

FIG. 3 shows the structure of the control circuit 13. As shown in FIG. 3, the CPU 16 in the form of a microprocessor is connected through an interface 17 with a host apparatus such as a host computer 18, a scanner 19 or the like. It controls the recording operation in accordance with the print data which is supplied from the host apparatus and which is stored in program memory 20 in the form of ROM or a buffer memory 21 in the form of RAM.

The CPU 16 controls a CR motor 3, LF motor 7 and sheet feeding motor 10 through a motor driver 22, and controls the recording head 1 through a head driver 23 on the basis of print information stored in the RAM 21.

Figure 4:
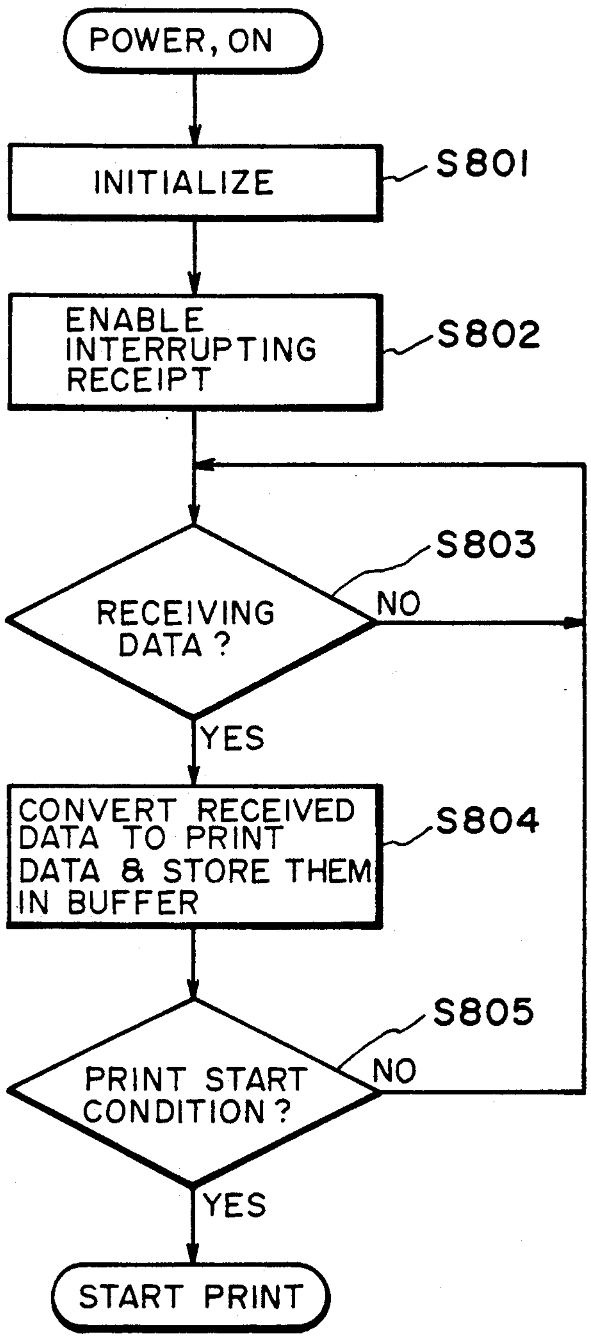
FIG. 4 a flow chart showing the sequential recording operation by the CPU shown in FIG. 3.
Figure 5:
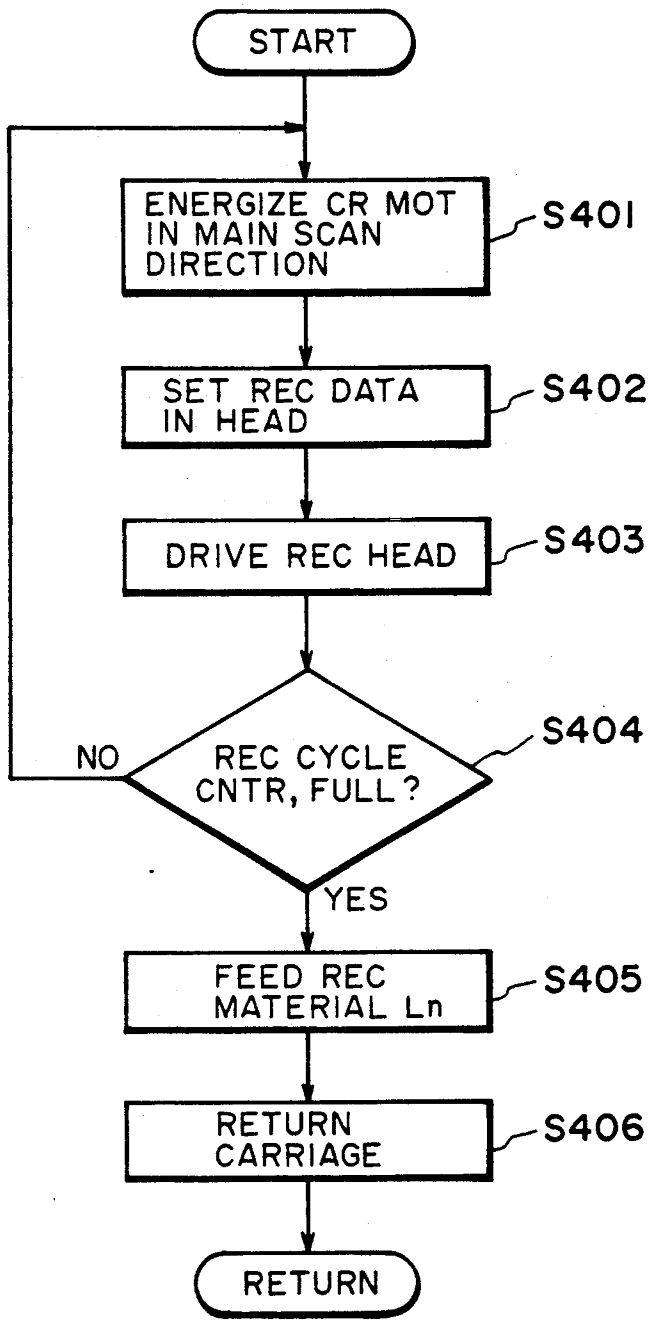
FIG. 5 is a flow chart showing the control steps in the printing operation.
Figure 6:
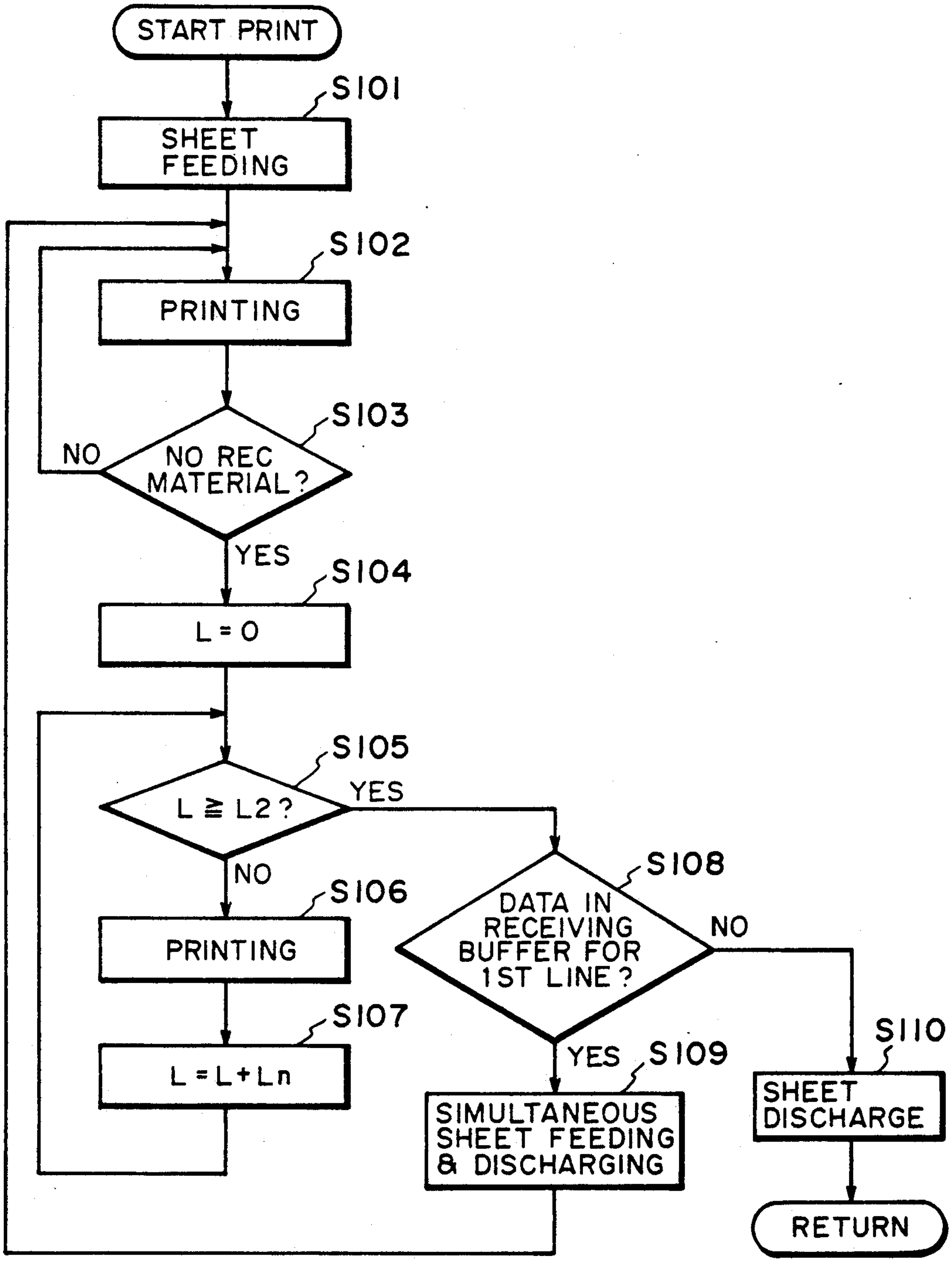
FIG. 6 is a flow chart showing the control steps after start of the printing operation.

FIGS. 4, 5 and 6 are flow charts showing the recording process steps by the CPU 16 the program in accordance with the flow charts is stored in the ROM 20.

Upon actuation of the main switch, the control system is initialized (step S801). Thereafter, the interrupting receipt is permitted at step S802, by which the recording apparatus is permitted to receive data from the host apparatus, independently of the sequential control of the recording apparatus. At step S803, the recording data is supplied from the host apparatus connected with the recording apparatus. Then, at step S804, the data received in the recording buffer in the RAM 21 are converted to the printing data, which are stored. At step S805, a print starting command is received from the host apparatus. Until a predetermined amount of recording data, determined on the basis of the capacity of the receiving buffer or determined by one scan data, is received, the steps S803, S804 and S805 are repeated. When the printing condition is met at step S805, the printing operation is started.

Referring to the flow chart of FIG. 5, the description will be made as to the control steps in the printing operation. This corresponds to a step S102 and step S202 of FIGS. 6 and 7 which will be described hereinafter.

At step S401, the CPU 16 drives the CR motor 3 to move the carriage 2 in the main scan direction. At step S402, the control circuit 14 sets the data in the recording head 1. At step S403, the recording head 1 is driven. A recording cycle counter in the RAM 21 is incremented by +1, for each drive of the recording head. Using the recording cycle counter, discrimination is made as to whether the one line recording is completed or not. If the result of the discrimination shows that the cycle number corresponding to the recording width is not reached, the operation returns to the step S401, and the steps S401 - S403 are repeatedly executed.

When one line recording is discriminated as being completed, at step S404, the LF motor is driven at step S405 to feed the recording material a predetermined distance LN in accordance with a recording width by one scan (measured in the sub-scan direction). At step S406, the CR motor is driven to return the carriage 2 to a predetermined position.

The control steps after the start of the printing will be described in conjunction with FIG. 6.

At step S101, the sheet feeding motor 10 is driven to rotate the sheet feeding roller 9 so as to feed the recording material 12 from the sheet supply stacker 11 to the feeding roller 6. Thereafter, the feeding roller 6 is driven by the LF motor 7 to feed the recording material 12 to the recording position 14. Then the printing operation is effected at step S102. After completion of one printing operation, the discrimination will be made at step S103 by the sensor 15 whether the trailing edge of the recording material 12 reaches the position of the sensor. When the trailing edge of the recording material 12 has not yet reached the position of the sensor 15, the operation of the step S102 is repeated. When the trailing edge of the recording material 12 passes by the sensor 15, the operation proceeds to steps S104–S107.

In these steps, the printing operation of step S106 which is the same as the step S102 is repeated until the integration L of the recording material feed Ln in the printing operation after passage of the trailing edge of the recording material 12 by the sensor 15 exceeds the printable distance L2 after the passage of the trailing edge of the recording material 12 by the sensor 15.

When the condition $L \geqq L2$ is satisfied, the operation proceeds to step S108 where the discrimination is made as to whether the printing data from the host apparatus remains in the buffer memory. If so, the operation proceeds to step S109 where the LF motor 7 drives the feeding roller 6 and the discharging roller 24 to discharge the recording material 12 to the discharge stacker 25, and the feeding motor 10 is driven to rotate the sheet feeding roller 9 to feed the next recording material to the feeding roller 6.

If the discrimination at step S108 is negative, that is, the buffer memory does not contain the printing data from the host apparatus, the operation proceeds to step S110, where the LF motor 7 is driven to drive the feeding roller 6 and the discharging roller 24, thus discharging the recording material 12 to the sheet discharging stacker 25, and the printing operation is terminated.

In this control method, where the printing data are printed on a plurality of recording materials, the discrimination is made at step S108 upon completion of printing in a printable region of one recording material before the sheet is discharged, and the sheet feeding operation is performed on the basis of the discrimination. Therefore, the time period required for discharging the sheet can be reduced from that required in the conventional control method, so that the throughput of the printing apparatus can be increased.

Another Embodiment

In the foregoing embodiment, the discrimination as to whether the buffer memory contains the printing data for the next image is made at a point of time when the printing for the printable region of one recording material is completed, and the sheet is or is not fed on the basis of the discrimination. In the present embodiment, the buffer memory is capable of storing the printing data covering a plurality of lines. When it becomes possible to discriminate whether the buffer memory contains the printing data for the next page during one recording material printing, the discrimination is made as to whether or not the printing data for the next page is present in the buffer memory or not. On the basis of the discrimination, the recording material is fed or not fed.

Figure 7:
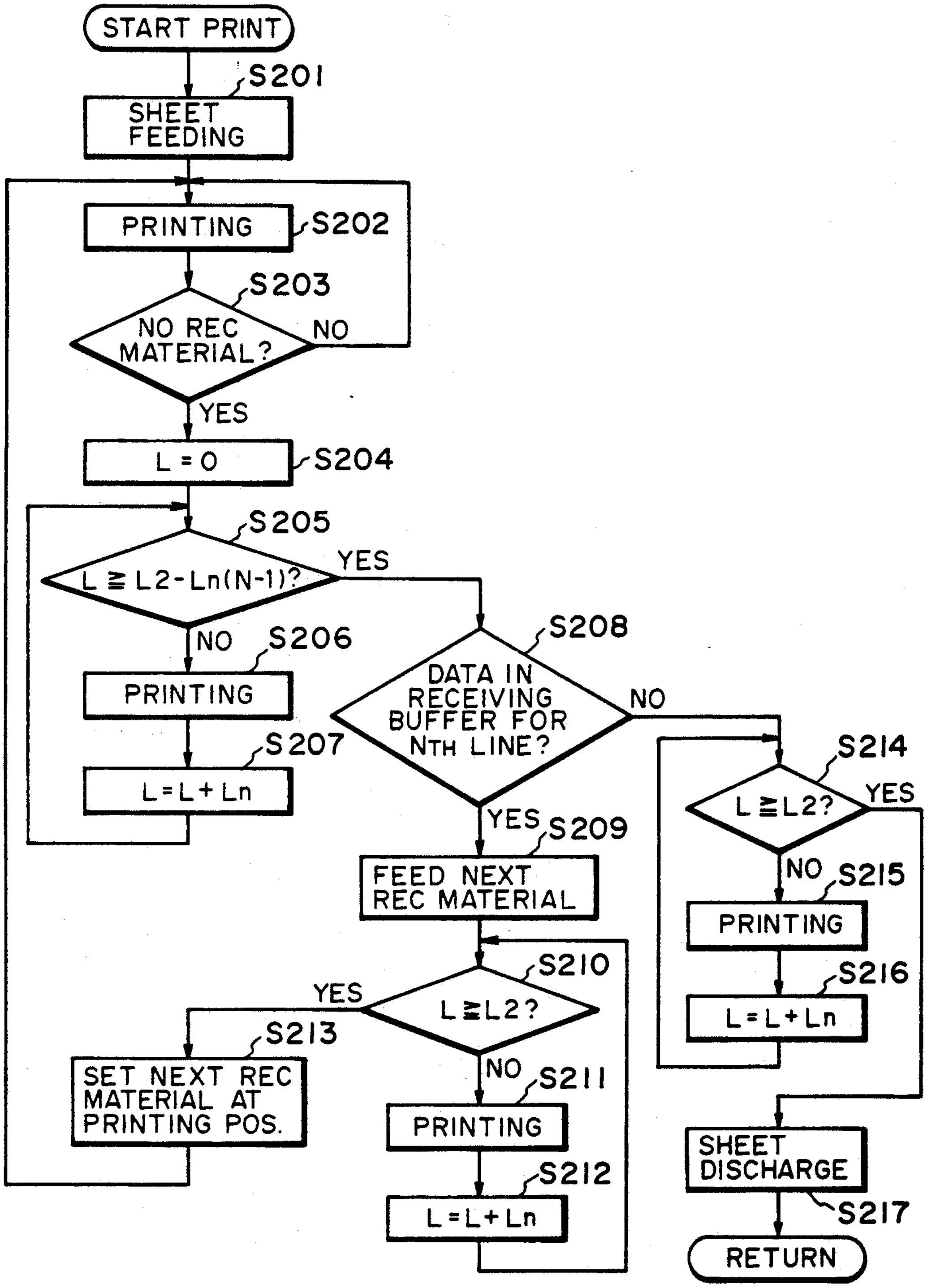
FIG. 7 is a flow chart showing the control steps after start of the printing operation, according to another embodiment of the present invention.

FIG. 7 is a flow chart illustrating the process controlling steps after the start of the printing, in this embodiment. The operational steps immediately after the main switch is actuated and during the printing operation are the same as those in FIGS. 4 and 5. Therefore, the description thereof is omitted.

At step S201, the sheet feeding motor 10 is driven to rotate the sheet feeding roller 9, and the recording material 12 on the sheet feeding stacker 11 is conveyed to the conveying roller 6. Thereafter, the conveying roller 6 is driven by the LF motor 7 to feed the recording material 12 to the recording position 14. Next, the printing operation is effected at step S202. Upon completion of one printing operation, the discrimination is made at step S203 as to whether or not the sensor 15 detects the trailing edge of the recording material 12. If not yet, the operation of step S202 is repeated. If the trailing edge of the recording material 12 has already passed by the sensor 15, the operation proceeds to steps S204–S207. In these steps, the printing operation of step S206 (same as that of step S202) is repeated until the integration L of the recording material feed distance Ln in the printing operation after the trailing edge of the recording material 12 passes by the position of the sensor 15 exceeds L2 - Ln(N−1), where L2 is a predetermined printable distance after the trailing edge of the recording material 12 passes by the position of the sensor 15; and N is the number of printing lines of the storable printing data of the buffer memory.

In this embodiment, the buffer memory is capable of storing the printing data covering N scans. Whenever the data for the first scan in the buffer memory is recorded, the second, the n-th scans data are respectively shifted, and the storing area for the n-th scan stores a new line data at all times.

When $L \geqq L2 - Ln(N-1)$ is met, the operation proceeds to step S208, where the discrimination is made as to whether or not the printing data from the host apparatus is present or not at the area of the buffer memory for the n-th scan for storing the n-th scan line print information. If it is present, the operation proceeds to step S209 to drive the sheet feeding motor 10, rotate the sheet feeding roller 9 and feed the next recording material to the feeding roller 6.

Then the operation proceeds to steps S210–S212. Here, the printing operation of step S211 (same as the operations of steps S202 and S206) is repeated until the integration L of the recording material feeding distance Ln in the printing operation after the trailing edge of the recording material 12 passes by the position of the sensor 15 exceeds the printable distance after the trailing edge of the recording material 12 passes by the position of the sensor 15. If the results of discrimination of step S210 is $L \geqq L2$, the operation proceeds to step S213, where the LF motor 7 drives the feeding roller 6 to feed the next recording material 12 to a predetermined printing position in the sub-scan direction. Then, the operation returns to the step S202 to start the printing on the next recording material. At this time, the current recording material is discharged to the sheet discharging stacker 25 during the printing on the next recording material, because the sheet discharging roller 24 is driven by the driving of the LF motor 7 for feeding the next recording material in the sub-scan direction.

If the result of discrimination at step S208 is an absence of the printing signal from the host apparatus, the operation proceeds to steps S214–S216. In these steps, the printing operation is repeated until $L \geqq L2$, similarly to steps S210–S212. If $L \geqq L2$ is reached, the operation proceeds to step S217. At the step S217, the LF motor 7 is driven to drive the feeding roller 6 and the discharging roller 24 to discharge the recording material 12 to the sheet discharging stacker 25. Thus, the printing operation is completed.

The description will be made as to a further embodiment of the present invention.

Figure 8:
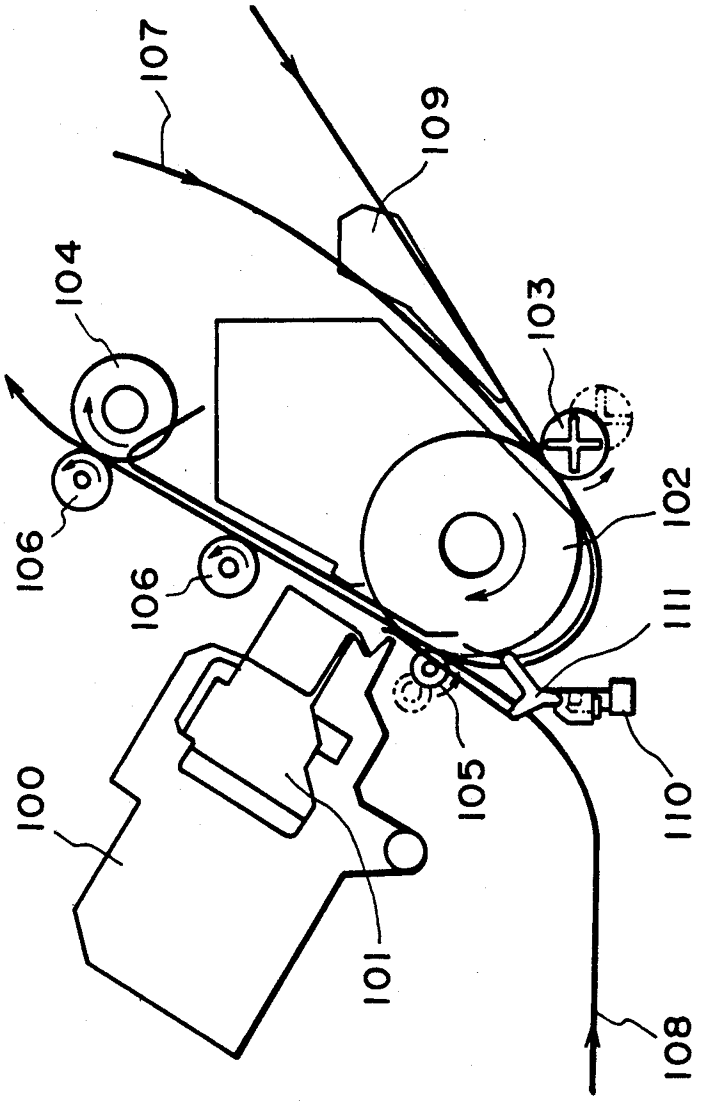
FIG. 8 is a sectional view of a recording apparatus according to another embodiment of the present invention.

FIG. 8 shows the recording apparatus according to this embodiment. A carriage 100 carries the recording head 101 and is reciprocable in a horizontal plane (perpendicular to the sheet of the drawing) relative to the recording material, by being driven by a carriage motor which will be described hereinafter. The recording head 101 has the similar structure as in the foregoing embodiments. A feed roller 102 functions to feed the recording material in the vertical direction relative to the recording head 101. It is driven by an LF feed motor which will be described hereinafter. A rear bottom feed roller 103 rotates following the feed roller 102. A recording material discharging roller 104 is driven by the LF motor. A guide roller 105 functions to urge the recording material to the feed roller 102. Designated by reference numeral 106 is spur. The recording material in the form of a cut sheet is fed from a cut sheet feeder (not shown) disposed at the rear portion of the apparatus and is fed to the recording position along the sheet passage 107 by the feed roller 102, and is discharged by the discharging roller 104 after the recording operation. In addition, the recording material (cut sheet) may be fed at the front portion of the recording apparatus manually. It is also fed to the recording position along the sheet passage 108.

In the case of the continuous sheet, it is fed along the sheet passage 109 from the rear portion of the recording apparatus by a pin feed tractor (not shown).

In order to detect the recording material conveyed along each of the sheet passages, a recording material sensor has a sensing portion 110 of a photocoupler type and a sensor flag 111 is used to detect the presence or absence of the recording material, or the error such as jamming of the recording sheet or the like.

Figure 9:
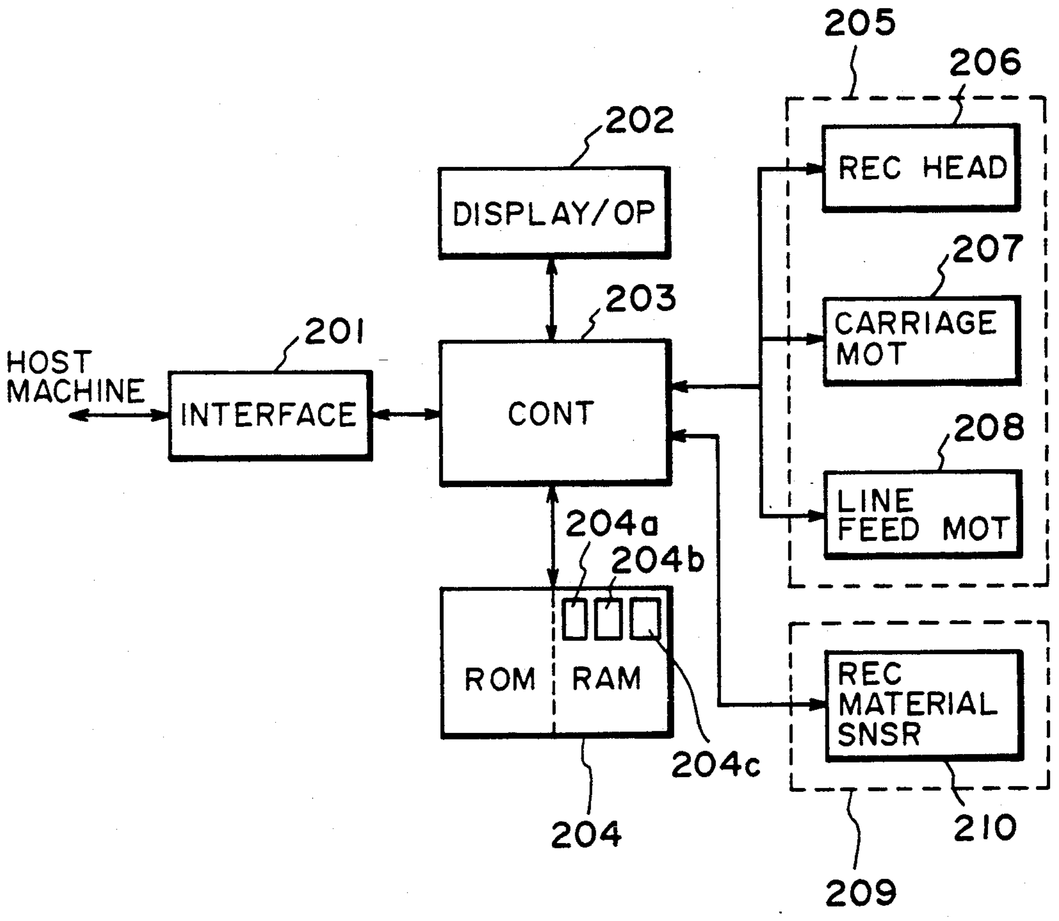
FIG. 9 is a block diagram of a control system for the recording apparatus of FIG. 8.

FIG. 9 is a block diagram of a control system for the apparatus of FIG. 8. It comprises an interface 201 for receiving recording data or control data fed from the host computer. A display and operation panel 202 comprises a displaying portion for displaying states of the recording apparatus and a group of keys for selecting operational modes. A controller 203 reads data in control ROM/RAM 204 to control the entirely of the apparatus.

The ROM of the controlling ROM/RAM 204 stores the program for effecting the control of the entire apparatus. The RAM is the memory for storing the printing data, and comprises a receiving buffer 204*a* for storing the received data, a text buffer 204*b* for storing the printing data after the received data is analyzed, and an image buffer 204*c* for storing the image data to which the received data are converted.

The apparatus comprises a recording portion 205, a recording head 6 (corresponding to the recording head 101 of FIG. 8), a carriage motor 207 for moving the carriage 100 carrying the recording head 6, and a line feed motor 208 for driving the feeding roller 102 for feeding the recording material.

Figure 10:
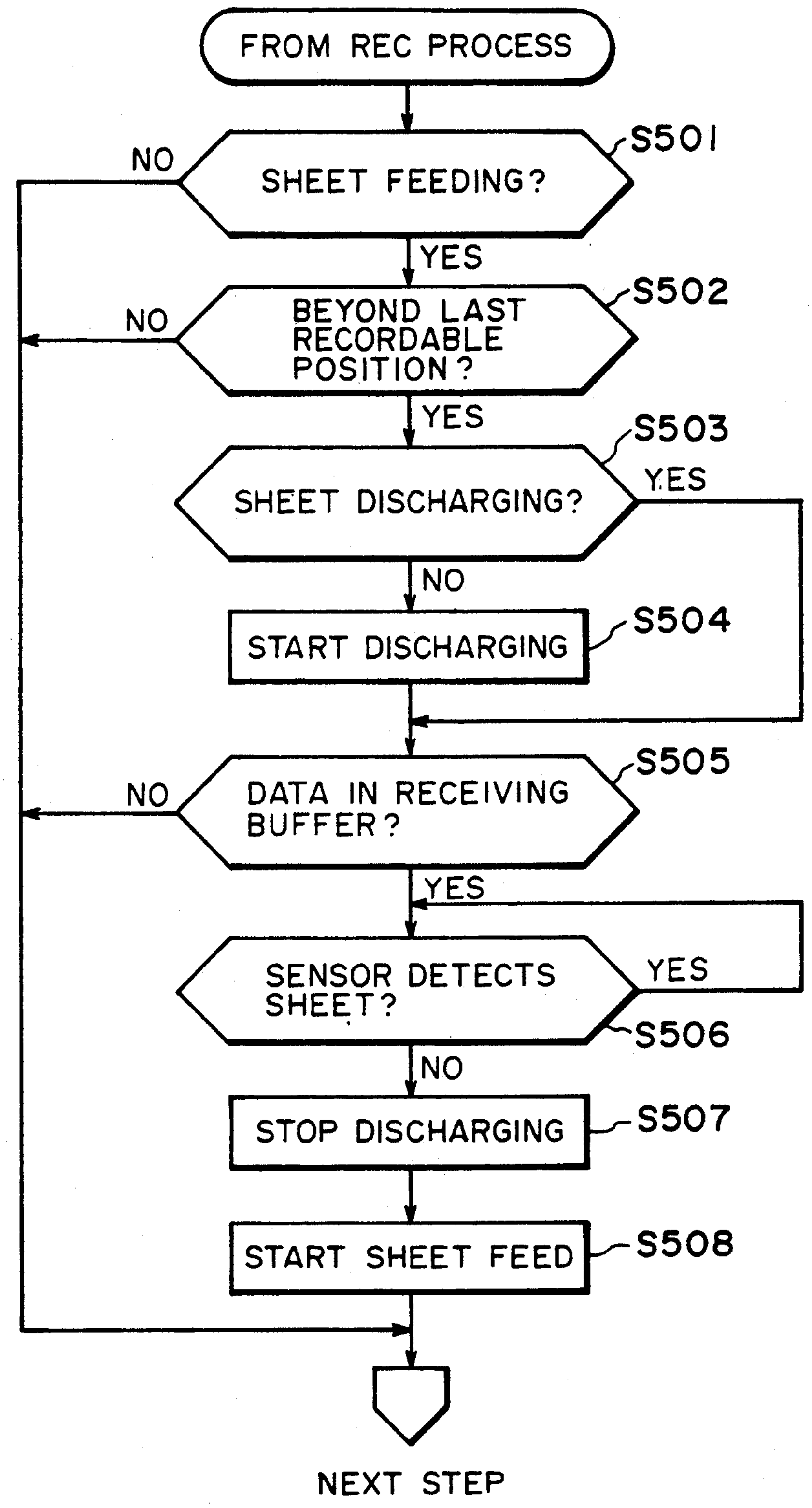
FIGS. 10–12 are flow charts showing the recording operation steps.
Figure 11:
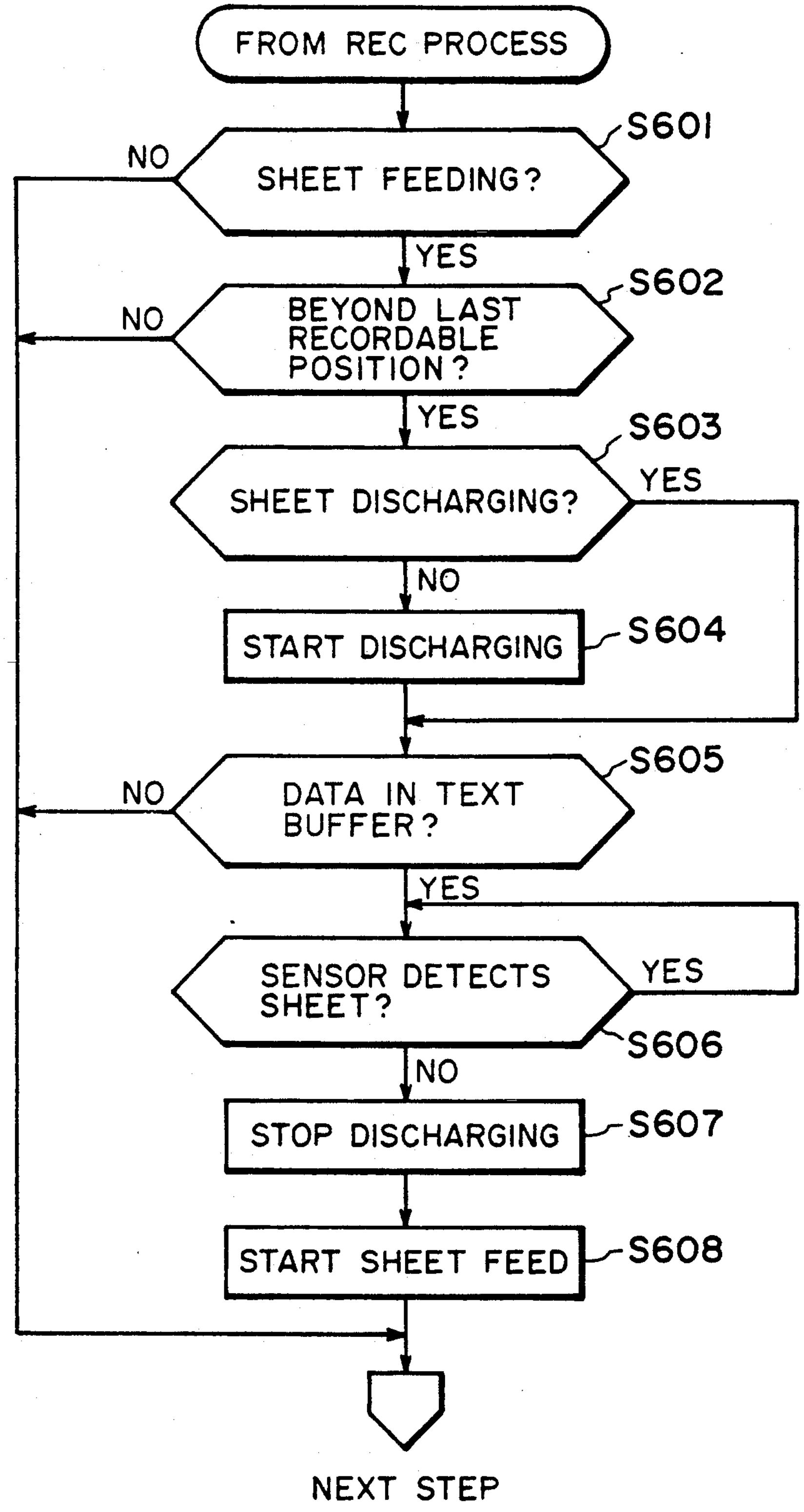
Figure 12:
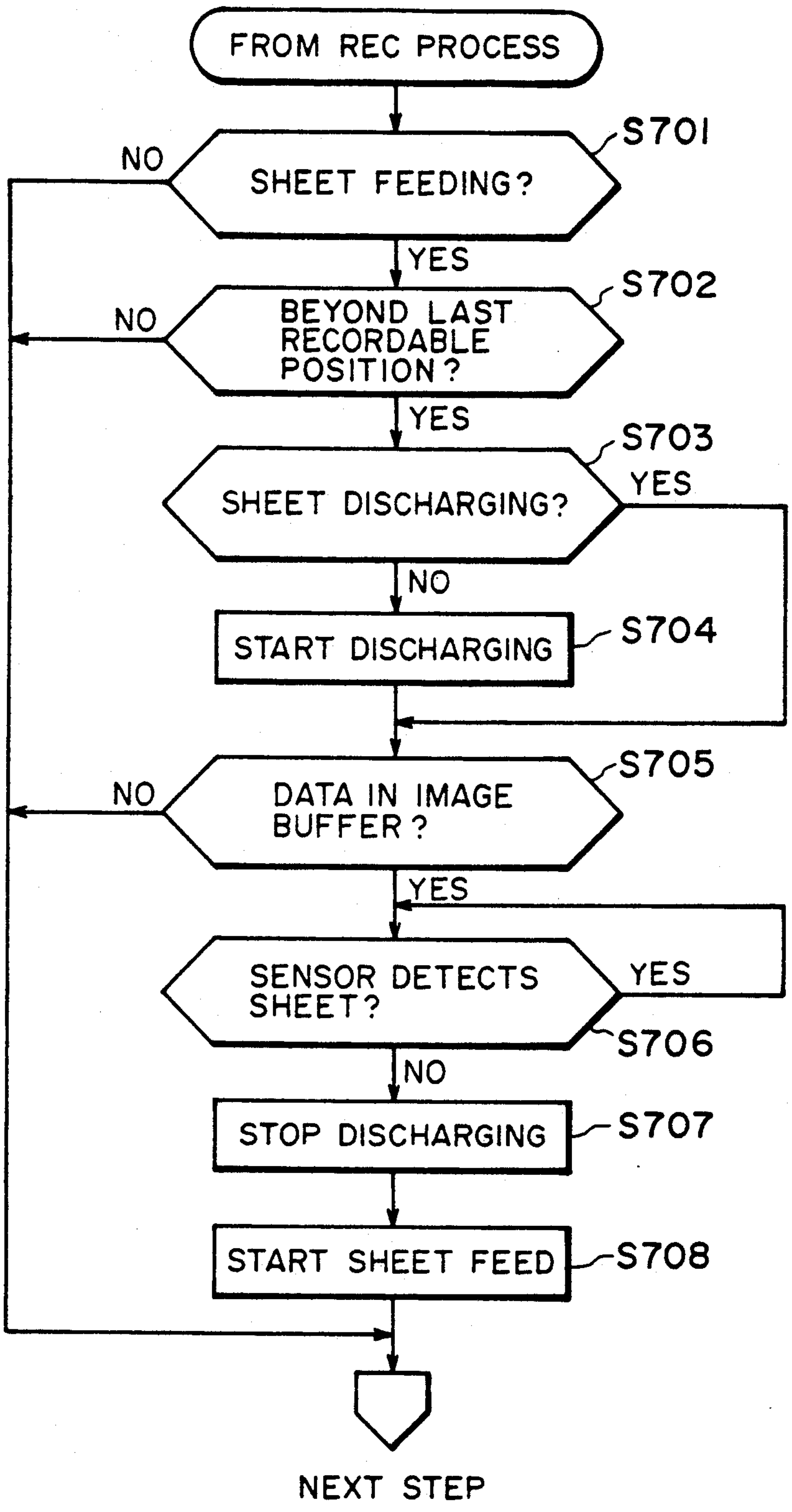
Figure 13:
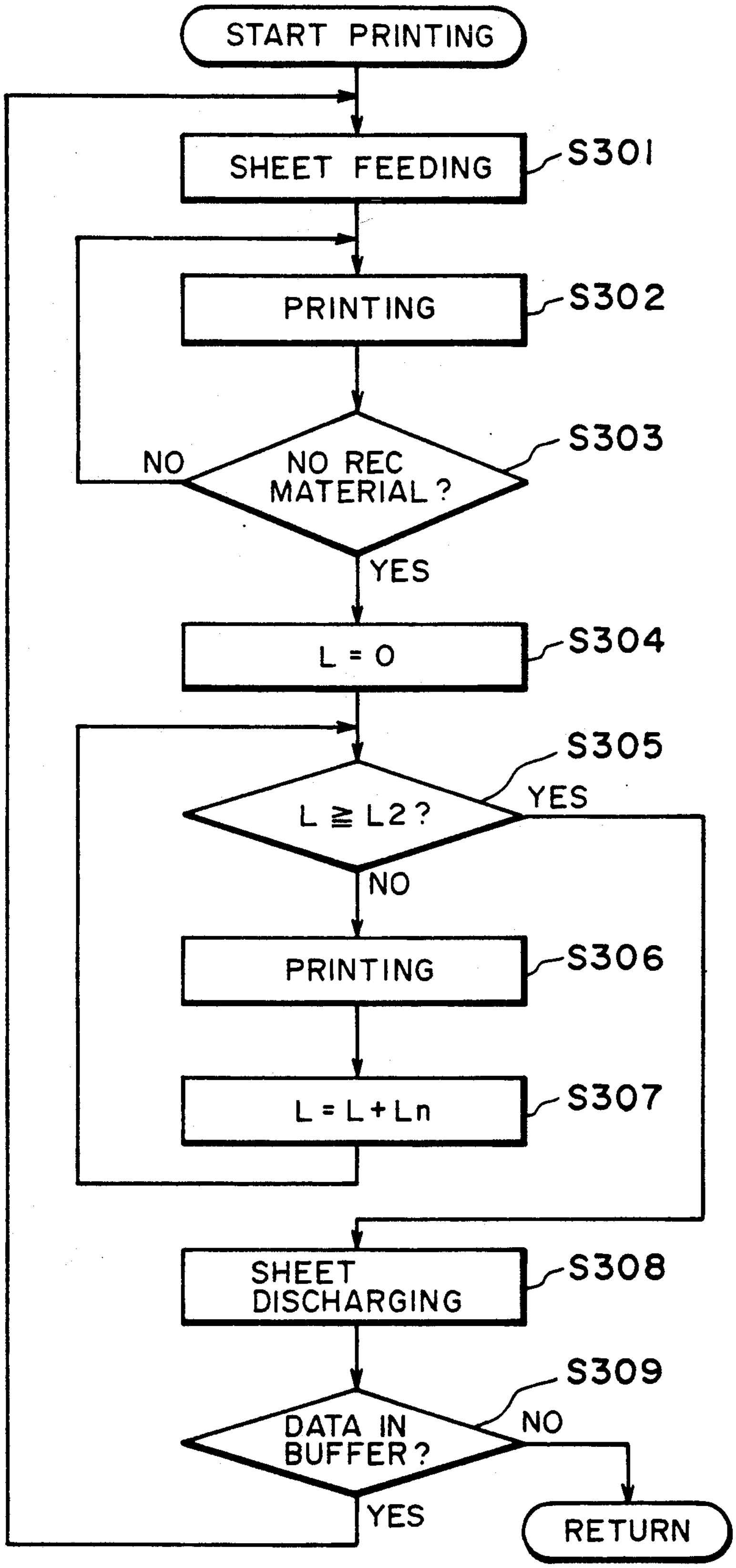
FIG. 13 is a flow chart of the sequential operation in a conventional recording apparatus.

A recording material sensor 210 comprises a sensing portion 110 and a sensor plug 111. Referring to FIGS. 10, 11 and 12 (flow charts), the operation will be described, wherein the initializing and recording operations are omitted, since they are not directly concerned with the present embodiment. Also, the motor interruption control used in the actual operations is also omitted for the sake is simplicity.

At step S501 in FIG. 10, the discrimination is made as to whether the sheet feeding operation is to be carried out after the recording operation or not. If not, the next process is executed to analyze and convert the next data. If the sheet feeding operation is to be carried out, the discrimination is made at step S502 as to whether or not the last recording position on the current recording sheet is to be exceeded or not by the current sheet feeding operation. If not, the next step is performed. The discrimination is made, similarly to the foregoing embodiment, on the basis of whether or not the integration of the recording material feeding distances after the recording material sensor 210 detects the trailing edge of the recording material exceeds the predetermined printable distance. If it exceeds the last recording position, the operation proceeds to step S503. At step S503, the discrimination is made as to whether or not the sheet discharging operation is being carried out. If so, step S505 is executed. If the sheet discharging operation is not carried out, step S504 is executed by which a line feed motor 208 is driven to start the sheet discharging operation, and the operation proceeds to step S505. Axial recording sheet feeding operation is carried out by an interrupting operation, but the operational control therefor is not shown.

At step S505, the state of the receiving buffer 204*a* is discriminated, and the next process is determined. If the receiving buffer does not have the data, the sheet discharging operation is continued, and the next data is analyzed and converted. If the receiving buffer has the data, the operation proceeds to step S506 where the sheet discharging operation is carried out until the recording sheet departs from the recording sheet sensor 210.

When the recording sheet is away from the recording sheet sensor 210 at step S506, the operation proceeds to step S507, and the recording sheet feeding operation which is the current sheet discharging operation is interrupted to be prepared for the next operation. When the line feed motor 208 stops, the operation proceeds to step S508 to drive the line feed motor 208 to feed the next recording sheet.

The sheet feeding operation of the step S508 automatically discharge the previous recording sheet.

As described hereinbefore, the presence or absence of the data is confirmed in the receiving buffer during the sheet discharging operation or upon the start of the sheet discharging operation. The sheet feed control is effected on the basis of a count of pulses applied to the line feed motor 208 by a counter in the RAM. Therefore, upon the feeding of the next recording material, the line feed motor 208 is temporarily stopped to interrupt the last sheet discharging operation, and the counter is reset. Thereafter, the line feed motor 208 is resumed, and the pulse counting operation is started. By doing so, the recording material feeding accuracy is improved.

Thus, a part of the sheet discharging operation is replaced with the next sheet feeding operation, and the previous recording sheet is automatically discharged, by which the time required until the recording is effected on the next recording sheet is reduced.

In this embodiment, when the data (not limited to the character data to be recorded but includes control data) are in the receiving buffer. It is deemed that the recording data is present for the next page, so that the control is effected to feed the next recording sheet.

Referring to FIG. 11, the description will be made as to a further embodiment. The steps S601–S604 of FIG. 11 are the same as those in FIG. 10, and therefore, the detailed description thereof is omitted for simplicity. At step S605, the discrimination is made on the basis of the state of the text buffer 204*b*, and the next process is determined. More particularly, when the text buffer 204*b* does not contain data, the sheet discharging operation is continued, and the next data are analyzed and converted. On the other hand, the text buffer 204 includes data, step S206 is executed by which the sheet feeding operation which is the sheet discharging operation is continued until the recording sheet is away from the recording sheet sensor 211.

When the recording sheet is away from the sensor 210 at step S606, the operation proceeds to step S607, by which the recording sheet feeding operation which is the current sheet discharging operation is interrupted to be prepared for the next operation. When the line feed motor S608 stops, step S208 is executed to feed the next recording sheet.

By the sheet feeding operation at step S608, the previous recording sheet is automatically discharged.

As described in the foregoing, during the sheet discharging operation or upon the start of the sheet discharging operation, the presence or absence of the data in the text buffer 204*b* is checked, and a part of the sheet discharging operation is replaced with the sheet feeding operation, so that the previous sheet is automatically discharged. Thus, the time required until the recording on the next recording sheet is decreased.

That is, in this embodiment, when the data is in the text buffer 204*b*, the recording data for the next page are present, so that the next sheet is fed.

In this manner, the next recording sheet is fed not after the completion of the previous sheet discharging but after the recording sheet is away from the recording sheet sensor, so that the total processing period is reduced. Therefore, the throughput is improved.

In FIG. 10 embodiment, the next recording sheet is supplied on the basis of a prediction that the recording data will be present. In the FIG. 11 embodiment, however, the operation is effected on the basis of the content in the text buffer stored when the recording data is present. Therefore, the certainty of the operation is further improved.

Referring to FIG. 12, a yet further embodiment will be described. The structure of the circuit is the same as in FIG. 9 embodiment. Steps S701–S704 of FIG. 12 are the same as the steps S501–S504 in FIG. 10 embodiment, and therefore, the description thereof is omitted.

At step S705, the discrimination is made on the basis of the state of the image buffer 204, and the next process is determined. More particularly, when the image buffer 204C does not have data, the sheet discharging operation is continued, and the next data is analyzed and converted. On the other hand, if the data is in the image buffer 204c, step S706 is executed by which the sheet discharging operation which is the next sheet feeding operation is carried out until the current recording sheet is away from the recording sheet sensor 210.

When the recording sheet is away from the sensor 210 at step S706, step S707 is executed, where the recording sheet feeding operation which is the current sheet discharging operation is interrupted to be prepared for the next operation.

When the line feed motor 208 stops, step S708 is executed, by which the line feed motor 208 is driven to supply the next recording sheet.

By the sheet feeding operation at step S708, the previous recording sheet is automatically discharged.

As described in the foregoing, during the sheet discharging operation or upon start of the sheet discharging operation, the presence or absence of the data in the image buffer is checked. A part of the sheet discharging operation is replaced with the next sheet feeding operation, by which the previous recording sheet is automatically discharged. By doing so, the time required until the recording is effected on the next recording sheet is reduced. In this embodiment, when there is data in the image buffer, it means that there is the recording data for the next page, and therefore, the next recording sheet is supplied.

Thus, the next sheet is fed not after the completion of the current sheet discharging operation but after the recording sheet is away from the recording sheet sensor, and therefore, the time period required for the sheet feeding operation is reduced. Therefore, the throughput is improved.

In the foregoing FIG. 10 embodiment, the next recording sheet is fed on the basis of a prediction that the recording data will be present. However, in the FIG. 12 embodiment, the operation is effected on the basis of the content of the image buffer which is stored when the recording data is present. Therefore, the operation is further assured.

As described in the foregoing, the presence or absence of the recording information for the next page is checked during the discharging operation of the current recording sheet, and a part of the sheet discharging operation is omitted, and the time period corresponding to the omitting is used for the next recording sheet feed operation to automatically discharge the current sheet. By doing so, the time period from the start of the sheet discharging operation to the start of the recording on the next sheet is reduced, so that the time period until the completion of the recording is reduced, thus increasing the throughput.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the abovementioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases. the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

The present invention is not limited to the use with the ink jet recording apparatus using thermal energy, but it is usable with an ink jet recording apparatus using piezoelectric elements, or a thermal transfer type recording apparatus, or heat sensitive sheet type recording system.

While the invention has been described with reference to the structures disclosed herein, it is not confined to the details set forth and this application is intended to cover such modifications or changes as may come within the purposes of the improvements or the scope of the following claims.

What is claimed is:

1. A recording apparatus using a recording head driven in accordance with print information, comprising:

feeding means for feeding a recording material;

discriminating means for discriminating a presence or absence of next printing information before completion of discharging of a current printed recording material; and control means for controlling said feeding means to start feeding of the next recording material prior to completion of the discharging of the current recording material, when said discriminating means discriminates the presence of the next printing information.

2. An apparatus according to claim 1, wherein said discriminating means conducts a discriminating operation after start of discharging of the current recording material and before completion of the discharging.

3. An apparatus according to claim 1, wherein said discriminating means conducts a discriminating operation prior to start of discharging operation of the current recording material.

4. An apparatus according to claim 1, 2 or 3, wherein said control means controls said feeding means to start feeding of the next recording material prior to completion of discharging of the recording material.

5. An apparatus according to any one of claims 1–3 wherein said recording head has an ejection outlet through which a droplet of ink is ejected, an ink passage in communication with said ejection outlet and an energy generating element for producing energy contributable to eject a droplet of ink through the ejection outlet by change of state of the ink produced when driven by printing information.

6. An apparatus according to claim 5, wherein, said energy generating element generates sufficient thermal energy to produce a bubble to eject a droplet of the ink through said ejection outlet.

7. A recording apparatus using a recording head driven by print information, comprising:

storing means for temporarily storing at least one scan print information in at least a main scan direction;

feeding means for feeding a recording material in a sub-scan direction or each main scan operation.

detecting means for detecting an edge of the recording material upstream of a recording position in the sub-scan direction;

discriminating means for discriminating a presence or absence of the print information in said storing means at a point in time when the recording material is fed through a predetermined distance after detection of an edge of the recording material by said detecting means; and control means for controlling said feeding means to feed the next recording material to said recording position when said discriminating means discriminates presence of the print information.

8. An apparatus according to claim 7, wherein said detecting means detects a trailing edge of the recording material.

9. An apparatus according to claim 8, wherein said predetermined distance corresponds to a remaining recordable width on the recording material when said detecting means detects the trailing edge of the recording material.

10. An apparatus according to claim 7, wherein said storing means is capable of storing print information for N scans.

11. An apparatus according to claim 10, wherein the predetermined distance corresponds to a difference between a remaining recordable width on the recording material when said detecting means detects the trailing edge of the recording material and a movement distance corresponding to $(N-1)$ scans.

12. An apparatus according to any one of claims 7-11, wherein said recording head has an ejection outlet through which a droplet of ink is ejected, an ink passage in communication with said ejection outlet and an energy generating element for producing energy contributable to eject a droplet of ink through the ejection outlet by change of state of the ink produced when driven by printing information.

13. An apparatus according to claim 12, wherein said energy generating element generates sufficient thermal energy to produce a bubble to eject a droplet of the ink through said ejection outlet.

14. A recording apparatus using a recording head driven in accordance with print information, comprising:

storing means for temporarily storing record information for at least one scan until a recording operation is completed;

accommodating means for accommodating recording materials;

detecting means disposed between said accommodating means and a recording position where recording is effected on the recording material, for detecting a presence or absence of a recording material at a position L1 away from the recording position toward upstream with respect to a sub-scan direction;

discriminating means for discriminating a presence or absence of the record information in said storing means at a point in time when the recording material is fed through a predetermined distance $L(\geqq L1)$ after said detecting means detects a trailing edge of the recording material;

feeding means for feeding a next recording material to the recording position when said discriminating means discriminates the presence of the record information.

15. A recording apparatus using a recording head driven in accordance with print information, comprising:

storing means for temporarily storing record information for N (N: positive integer) scans until recording operation is completed;

accommodating means for accommodating a recording material;

detecting means disposed between said accommodating means and a recording position where recording is effected on the recording material for detecting a presence or absence of the recording material at a position L1 away from the recording position toward upstream with respect to a sub-scan direction;

discriminating means for discriminating presence or absence of recording data for N-th line in said storing means at a point in time when the recording material is fed beyond a difference between a feeding distance until $(N-1)$th line and a recordable width L2 $(\leqq L1)$ upon the detection of a trailing edge of the recording material by said detecting means; and feeding means for feeding a next recording material when a total feeding distance of the recording material exceeds the recordable width L2, when said discriminating means discriminates the presence of N-th line data.

* * * * *

UNITED STATES PATENT AND TRADEMARK OFFICE

CERTIFICATE OF CORRECTION

PATENT NO. : 5,223,858

DATED : June 29, 1993

INVENTOR(S) : YOKOI, ET AL.

It is certified that error appears in the above-indentified patent and that said Letters Patent is hereby corrected as shown below:

COLUMN 3

Line 53, "16 the" should read --16. The--.

COLUMN 7

Line 33, "is" should read --of.

COLUMN 8

Line 31, "buffer. It" should read --buffer, it--.

Line 43, "hand, the" should read --hand, when the--.

Line 54, "motor S608" should read --motor 208--; and "step S208" should read --step S608--.

COLUMN 11

Line 14, "recording head" should read --mountable--.

Line 15, "mountable," should read --recording head,--.

Line 34, "is the" should read --in the--.

Line 40, "the application" should read --by the application--;

Line 56, "such as" should read --such as a--.

UNITED STATES PATENT AND TRADEMARK OFFICE

CERTIFICATE OF CORRECTION

PATENT NO. : 5,223,858

DATED : June 29, 1993

INVENTOR(S) : YOKOI, ET AL.

It is certified that error appears in the above-indentified patent and that said Letters Patent is hereby corrected as shown below:

COLUMN 12

Line 39, "wherein," should read --wherein--.

Line 49, "operation." should read --operation;--.

Signed and Sealed this

Thirteenth Day of December, 1994

Attest:

BRUCE LEHMAN

*Attesting Officer* *Commissioner of Patents and Trademarks*